United States Patent [19]

Jäger et al.

[11] Patent Number: 5,068,026

[45] Date of Patent: * Nov. 26, 1991

[54] PROCESS FOR THE PRODUCTION OF NON-PUFFING SHAPED CARBON BODIES

[75] Inventors: Hubert Jäger, Biberbach-Eisenbrechtshofen; Alfred Lorenz, Langweid, both of Fed. Rep. of Germany

[73] Assignee: SIGRI GmbH, Meitingen, Fed. Rep. of Germany

[*] Notice: The portion of the term of this patent subsequent to Jul. 16, 2008 has been disclaimed.

[21] Appl. No.: 489,192

[22] Filed: Mar. 6, 1990

[30] Foreign Application Priority Data

Mar. 6, 1989 [DE] Fed. Rep. of Germany ....... 3907158

[51] Int. Cl.$^5$ ................................................ C10G 9/06
[52] U.S. Cl. ...................................... 208/125; 208/39; 423/448; 423/449; 423/445; 264/29.1; 264/29.5
[58] Field of Search ................ 208/125, 131; 423/449, 423/448, 445; 264/29.1, 29.5

[56] References Cited

U.S. PATENT DOCUMENTS

| | | | |
|---|---|---|---|
| 2,814,076 | 10/1953 | Gartland | 264/29 |
| 2,922,709 | 1/1960 | Hetzel | 423/449 |
| 3,338,993 | 8/1967 | Juel et al. | 264/29 |
| 3,563,705 | 2/1971 | Grindstaff et al. | 23/204 |
| 3,642,962 | 2/1972 | Wallouch | 264/29 |
| 3,833,514 | 9/1974 | Wennerberg et al. | 423/449 |
| 3,835,033 | 9/1974 | Dugan et al. | 208/125 |
| 4,049,538 | 9/1977 | Hayashi et al | 208/131 |
| 4,140,623 | 2/1979 | Sooter et al. | 208/125 |
| 4,217,204 | 8/1980 | Sakai et al. | 208/125 |
| 4,233,138 | 11/1980 | Rollmann et al. | 208/125 |
| 4,308,177 | 12/1981 | Tucker | 264/29.1 |
| 4,312,745 | 1/1982 | Hsu et al. | 208/125 |
| 4,334,980 | 6/1982 | Hsu | 208/125 |
| 4,370,223 | 1/1983 | Bose | 208/125 |
| 4,479,804 | 10/1984 | Chen et al. | 208/131 |
| 4,534,949 | 8/1985 | Celaser et al. | 423/449 |
| 4,661,240 | 4/1987 | Kessick et al. | 208/131 |
| 4,875,979 | 10/1989 | Orac et al. | 201/17 |

FOREIGN PATENT DOCUMENTS 733073 7/1955 United Kingdom .

OTHER PUBLICATIONS

13th Biennial Conference on Carbon "Extended Abstracts and Program", Jul. 18-22, 1977; pp. 191-192.
16th Biennial Conference on Carbon, "Extended Abstracts and Program", Jul. 18-22, 1983; pp. 595-596.
Carbon '80; Internation Journal of Research, vol. 13, No. 2, 1981; Wagner et al., "Irreversible Expansion and Shrinkage During Graphitization of Isotropic Carbon Materials".

*Primary Examiner*—Helane E. Myers
*Attorney, Agent, or Firm*—Herbert L. Lerner; Laurence A. Greenberg

[57] ABSTRACT

The process produces carbon bodies from coal tar pitch coke which have a strongly reduced or no irreversible thermal expansion in the temperature range of 1400° to 2000° C. Before shaping, a sulphonate, carboxylate or phenolate of an alkaline earth metal which is at least partially soluble in the binder is added to the mixing constituents which consist of particulate coke and a cokable binder as raw materials. After the mixing, shaping and firing, bodies are obtained which have only slight puffing upon graphitization.

11 Claims, No Drawings

PROCESS FOR THE PRODUCTION OF NON-PUFFING SHAPED CARBON BODIES

Specification:

The invention relates to a process for the production of graphitized shaped carbon bodies from a dry material containing petroleum coke or coal tar pitch coke, at least one cokable binder and optional auxiliaries, by mixing, shaping, coking and graphitizing, in which a material reducing the irreversible thermal expansion of the shaped bodies upon heating to temperatures above 1400° C. is added to the components of the mixture before shaping.

Graphitized shaped carbon bodies, which are referred to below as graphite bodies, are used in large measure in electrothermal and electrochemical processes as well as in process technology, due to their good electrical and thermal conductivity, thermal shock resistance, corrosion resistance, mechanical strength and outstanding temperature resistance. The chief field of application is in the processing of electrosteel in which an arc burns between graphite electrodes with diameters up to 700 mm and lengths up to 2700 mm to produce a melting heat.

The production of graphite bodies, which extends over a few weeks, requires several expensive process steps. The required raw materials are also expensive. As a consequence of this, graphite bodies have a comparatively high price. One of the most important aims of the graphite producer is therefore to minimize production rejects and to produce products with high economic value. Graphite bodies are produced from coke, a carbonizable binder and optionally additions of auxiliaries. Dry starting materials are produced from the coke fractions obtained after the grinding and sieving according to the compositions provided, these are mixed with a binder generally while hot and the mixture is shaped under compression, for example by extrusion presses, to form bodies. The shaped bodies are fired to form coke bodies at up to temperatures of 700° to 1000° C., with there being conversion of the binder material into a coke matrix, and the coke bodies are converted to graphite bodies in electric furnaces by heating to 2500° to 3000° C. Today, the most important raw materials for coke are petroleum cokes, especially the anisotropic premium petroleum cokes, which are also known as needle cokes due to the frequently observed structure thereof. The needle cokes have comparatively excellent properties such as a low thermal coefficient of expansion, low electric resistance, good mechanical strength and a high thermal conductivity. They are therefore used for the production of graphite bodies which are to withstand the highest stresses, such as electrodes for Ultra High Power-electric melting furnaces.

In the last few years, high value cokes produced from coal tar pitch, so-called coal tar pitch needle cokes, have also become available. However, the production of large, loadable graphite bodies from such cokes is uneconomical because high rejection rates occur as a result of the formation of cracks upon graphitization. The formation of cracks is a general problem with graphitization of shaped bodies formed of almost all commercially used cokes. The source of the cracks is a rapidly occurring irreversible volume expansion in the temperature range of 1400° to 2000° C. which is known as "puffing" by those skilled in the art. In the procedure described above, mechanical stresses occur in the bodies which not only lead to the formation of micro and macro cracks in the texture, but also lead to rejection as a result of the graphite bodies breaking open. Moreover, this puffing results in an impairment of important properties of the graphite bodies such as the mechanical strength, the electrical resistance and the thermal conductivity, for example. The puffing can be reduced by slower heating. However, that solution is uneconomical and leads to losses in quality.

A source of the puffing with petroleum cokes is the sulphur content which lies between 0.3 and 1.5% in commercially available types. When the carbon shaped bodies pass through the temperature region of 1400° to 2000° C. e.g. upon graphitization, the sulphur is suddenly liberated in the form of gas and mechanical stresses build up which can lead to cracks as a consequence of the formation of a significant gas pressure in the bodies connected therewith. With petroleum cokes, there has been success in strongly reducing or suppressing the puffing through the addition of suitable inhibitors. The number of proposed puffing inhibitors is large and it is always a question of their being used in a fine distribution in the bodies to be graphitized. The amount of the inhibitor substances added in practice is 1° to 2% relative to the amount of coke in the starting mixture. An essential disadvantage with the use of puffing inhibitors is that the thermal coefficient of expansion of the graphite is increased thereby. This hinders the resistance of the graphite to temperature change and leads to a higher consumption of graphite with electrodes in steel works. It must therefore be an object to use as little as possible of a substance which is as effective as possible. This problem is not easily solved and there have been a large number of proposals for this purpose.

German Published, Prosecuted Application DE-AS 1 073 368, corresponding to U.S. Pat. No. 2,814,076, describes the use of salts of the alkali metals, like sodium or potassium carbonate, as puffing inhibitors. Electrode blanks cooled after firing are impregnated with a sodium or potassium carbonate solution and then graphitized.

The addition of chromium oxide to a coke-pitch mixture is disclosed by French Patent No. 1,491,497. In addition to the inhibition of puffing, the additive acts as graphitization catalyst.

In a process to be noted from British Patent No.733,073, oxides of chromium, iron, copper or nickel are added when grinding the coke and, in this way, are finely distributed over the surface of the coke during subsequent mixing with pitch. Upon graphitization of the shaped and fired bodies, they then act as puffing inhibitors.

U.S. Pat. No. 3,563,705 teaches the addition of mixtures of iron or calcium compounds with small amounts of titanium and zirconium compounds to the mixture of coke and binder in order to prevent puffing.

U.S. Pat. No. 3,338,993 describes the addition of calcium, magnesium, strontium and barium fluorides to the mixture of green or calcined coke and the binder, for the same purpose.

The addition of 1 to 3% calcium cyanamide or calcium carbide to green coke as sulphur binding and puffing inhibiting agents before calcining, is disclosed in U.S. Patent No. 3,642,962.

According to U.S. Pat. No. 4,308,177, additions of chlorinated naphthalenes with 4 to 8 chlorine atoms on the naphthalene nucleus also have a puffing inhibiting effect besides their effect as a pressing auxiliary and condensation material for pitch. Especially strong effects inhibiting the puffing are produced with simultaneous addition of chloronaphthalenes and inhibiting metal compounds like iron, chromium, copper, cobalt or manganese oxide, as well as alkaline earth metal fluorides, to the mixture of production components before shaping, apparently as a result of a synergistic effect.

U.S. Pat. Nos. 4,312,745 and 4,334,980 teach the production of cokes which have no puffing. For this purpose, chromium compounds, preferably chromium oxide (U.S. Pat. No. 4,312,745) or iron compounds, preferably iron oxide or calcium fluoride (U.S. Pat. No. 4,334,980) are added to a sulphur-containing starting composition and then coke is produced by the delayed coking process.

All of the previously-described references concern the addition of inhibitors in the production or working of petroleum cokes.

These processes are compromise solutions and have partially outweighing disadvantages as follows. As a result of the addition of metal compounds, the amount of ash formers in the graphite bodies is increased. Graphite products produced in this way cannot be used for purposes for which pure graphites are required, or can only be used after expensive purifying treatments. The coefficient of thermal expansion is increased as a result of the addition of metal-containing inhibitors. This impairs the resistance to sudden changes of temperature and leads to a higher consumption of graphite, e.g. in electrodes for steel works. Many of the proposed puffing inhibitors are not unobjectionable during treatment and/or they lead to emissions which are damaging to health, are corrosive and/or are a burden on the environment (fluorides, chlorides, nitrates, chromium, copper, nickel, cobalt compounds, chloronaphthalenes) during the manufacturing process. Alkali and alkaline earth metals as well as iron compounds act catalytically on the oxidation of carbon and are disadvantageous for high temperature uses. Finally, the supply, preparation and use of all of the additives requires expenditure.

A particular problem is obtained with use of cokes which have been produced from coal tar pitch.

Investigations (by K. W. Tucker et al at the 13th Biennial Conference on Carbon in Irvine, California, entitled Extended Abstracts, pages 191, 192; and by I. Letizia and M. H. Wagner at the 16th Biennial Conference on Carbon in San Diego, Calif., also entitled Extended Abstracts, pages 593, 594 as well as by E. G. Morris et al, on pages 595, 596 thereof) and experiences in technical processing have shown that the correlation existing for petroleum cokes between the level of sulphur content and the puffing, is not valid for coal tar pitch cokes and that in particular the puffing of the coal tar pitch cokes and the coal tar pitch needle cokes as a result of the addition of the usual inhibiting materials for petroleum cokes, such as e.g. iron oxide or chromium oxide cannot be reduced or cannot be reduced in sufficient measure. In practice, coal tar pitch cokes and coal tar pitch needle cokes show a marked puffing with sulphur contents which no longer give rise to any puffing with petroleum cokes. The puffing of petroleum coke is therefore not comparable with the puffing of cokes produced from coal tar pitches. The technical world therefore assumes that with cokes produced from coal tar pitches, besides sulphur, all other influencing factors such as nitrogen content, for example, are causes and they speak of an "anomalous puffing" of coal tar pitch cokes.

In spite of the availability of a large number of puffing inhibitors for petroleum cokes, this property of anomalous puffing has heretofore absolutely prevented the advantageous utilization of coal tar pitch cokes and of coal tar pitch needle cokes which are otherwise of equal value to premium petroleum cokes, for the economical production of large size graphite shaped bodies such as e.g electrodes for steel production, for reasons of availability and possession of raw material as well as for economic reasons.

It is accordingly an object of the invention to provide a process for the production of non-puffing graphitized shaped carbon bodies from components containing coal tar pitch coke or coal tar pitch needle coke and a binder, which overcomes the hereinafore-mentioned disadvantages of the heretofore-known methods of this general type, and in which:

1. the puffing of shaped bodies which have been produced from coal tar pitch coke or from coal tar pitch needle coke is controlled;
2. the amount of added inhibitor metal is reduced to less than half, in contrast to the prior art procedure, while none of the harmful emissions produced by the inhibitors occur any longer and the other above-described disadvantages are abolished or are strongly reduced; and With the foregoing and other objects in view there is provided, in accordance with the invention, in a process for the production of graphitized carbon bodies from components including a dry material containing coal tar pitch coke, at least one cokable binder and optional auxiliary components, by mixing, coking and graphitization, the improvement which comprises adding one compound of metals from the group consisting of magnesium, calcium, strontium and barium being at least partially soluble in the binder to at least one or all of the components of the mixture before shaping for reducing the irreversible thermal expansion of the shaped bodies upon heating to temperatures above 1400° C.

In accordance with another mode of the invention, there is provided a process which comprises adding one, two or more compounds of metals from the group consisting of alkaline earth metal sulphonates, alkaline earth metal carboxylates or alkaline earth metal phenolates as additives according to the invention.

The sulphonates are characterized by the general formula 2[R—SO$_3$]—metal, wherein R is an alkyl chain of 25 to 70 C-atoms and the metal is a metal from the group Mg, Ca, Sr and Ba. The carboxylates are described by the general formula 2[R—COO]—metal, wherein R is an alkyl residue of at least 8 and at most 40° C.-atoms and the metal is a metal from the group Mg, Ca, Sr and Ba. The phenolates are described by the general formula 2[R—C$_6$H$_4$—O]—metal, wherein R is a side chain connected to the aromatic ring of the phenol and having at least 8 and at most 40 C.-atoms and the metal is a metal from the group Mg, Ca, Sr and Ba. Such compounds can be obtained from the Lubrizol Corporation, 29400 Lakeland Boulevard, Wickliff, Ohio 44092.

In accordance with a further mode of the invention, there is provided a process which comprises adding the compound of metals until the content of alkaline earth metals amounts to 0.02 to 0.5% by weight, relative to the coke content of the mixture. An increase in the amounts to be added above the indicated limits does not lead to any further noticeable lowering of the puffing.

Instead of the indicated compounds, other alkaline earth metal compounds with organic residues, such as e.g. alkylphosphates, which are at least partially soluble in pitches, can be used.

By dissolution in the binder, preferably in a pitch binder, the puffing inhibitors are present in the finest possible distribution, in particular in a molecular distribution, and reach the entire surface, namely the visible exterior surface and the surface surrounding the open pore system, during the mixing process.

In addition, they are added to the mixture or to one or more mixing components in such a way that they are at least partially dissolved by the binder and are distributed therewith on the surface accessible to liquid.

The procedure for supply of the inhibitors can vary. They can:
1. be dispersed and dissolved in pitch and then is mixed together with the dry material; or
2. they can be supplied to one or more dry material components such as coke fractions and mixed into it; or
3. they can be added to the total amount of the binder-free composition components directly before or during the mixing procedure; or
4. they can be added to the mixture containing all of the components of the mixture during the mixing; or
5. it is also possible to add mixtures of different inhibiting substances and in the supply process one can furthermore make use of combinations of individual process steps in which the addition of partial amounts of the inhibitors is combined with the processing steps according to points 1 to 4.

Therefore, in accordance with an added mode of the invention, there is provided a process which comprises adding the compound of metals to at least one of the components to be mixed before or during mixing.

In accordance with a concomitant mode of the invention, there is provided a process which comprises initially mixing the compound of metals with the binder forming a new mixture, and then adding the new mixture to the particulate components of the mixture.

The mixing is carried out in such a way that the inhibitors are distributed uniformly over the entire mixture formed from the dry material components and the binder. This advantageously occurs through the use of suitable mixers such as intensive or kneader mixers, wherein the mixing times are matched to the set mixing objectives. The further procedure is as follows:

After the mixing, the so-called "green mixture" obtained is processed in conventional shaping configurations such as extrusion presses, die presses, isostatic or vibration compactors to form shaped bodies. The shaped bodies are then fired in firing ovens in a known manner with use of special temperature conditions, with exclusion of oxygen, at up to temperatures of about 700° to 1000° C., with a conversion to coke bodies taking place. These coke shaped bodies are then converted to graphite bodies at temperatures of about 2500° C. to 3000° C. in electrically heated furnaces, likewise with exclusion of oxygen.

With the process according to the invention, the amount of inhibitor metal which is added can be reduced to at least half in contrast to the heretofore usual and necessary procedure with additives that are not soluble in the binder, while maintaining the same effectiveness. As a result, the content of ash forming, oxidation promoting substances is drastically lowered. The impairment of the thermal expansion of coefficient is so little that it is no longer technically of significance. Harmfully acting emissions no longer occur. The additions according to the invention lower the pressing pressure in the shaping procedure and accordingly also act in an advantageous manner as a pressing aid or auxiliary. The production cost is lowered overall by these effects. An essential advantage of the invention lies in the possibility of also suppressing the puffing of coal tar pitch cokes and coal tar pitch needle cokes and accordingly of utilizing these cokes on an industrial scale to a greater extent than was heretofore possible. The formation of defects which give rise to rejects, such as cracks, is reduced to an acceptable amount in the production of large format shaped graphite bodies from these cokes.

Other features which are considered as characteristic for the invention are set forth in the appended claims.

Although the invention is illustrated and described herein as embodied in a process for the production of non-puffing shaped carbon bodies, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific examples.

Three procedures with the addition of different compounds according to the invention, and a comparative procedure without the addition of an inhibitor, were respectively carried out for coal tar pitch cokes. These procedures differ from one another only by the type of inhibitor substances being added. Therefore the description of the production of the test bodies is summarized below.

EXAMPLE 1.

100 parts by weight of ground coal tar pitch needle coke (sulphur content DIN 51724 T1 : 0.33%, hydrogen content DIN 51912 : 0.115%, density DIN 51901 : 2.085 g/cm3) with a maximum particle size of 1 mm were treated with 36 parts by weight of coal tar pitch (softening point DIN 52025 : 80.5° C., coking residue DIN 51905 : 54.5%). With the exception of the comparative starting material, an alkaline earth metal compound according to the invention which is at least partially soluble in the binder pitch, was added to each of the starting materials as an inhibitor substance in an amount which corresponded to 0.6% by weight of the metals Mg, Ca and Ba, related to the amount of coal tar pitch being used. A starting composition contained magnesium sulphonate with an alkyl side chain size of 25° to 70° C.-atoms, a magnesium content of $9\pm1\%$ by weight and a sulphur content of $2.2\pm0.3\%$ by weight dissolved in 37% mineral oil, density 1.10 g/cm3 (Lubrizol product identification OS 62052). The second composition contained calcium carboxylate with an alkyl side chain size of 8 to 12 C-atoms and a Ca content of $15\pm0.8\%$ by weight and a density of 1.15 g/cm3 (Lubrizol product designation OS 68150). The third composition contained barium phenolate with an alkyl side chain size of 8° to 12 C-atoms, a barium content of $27.5\pm0.5\%$ by weight and a density of 1.31 g/cm3 (Lubrizol product designation L 2106). The fourth composition, as a comparison, did not have any additives. The components of each composition were mixed in a heatable Z-arm kneader at 130° C. for 20 minutes. Then the mixtures were pressed into block blanks with a diameter of 50 mm and a length of 80 mm and the blanks were fired in a chamber furnace with a temperature gradient of 4 K/h up to a temperature of 800° C. Samples of a size 8×8×60 mm were cut out from these bodies and puffing measurements in the temperature range of 1400° to 2400° C. were carried out with a high temperature torque rod dilatometer, as is described by M. H. Wagner et al in the article High Temperatures—High Pressures volume 13, page 153 (1981). The volume expansion totalled over the measuring ranges is indicated as a measure of the puffing. These values were obtained for this purpose from the linear dilation values of the sample bodies according to Δ volume=3 Δ length. The results are indicated in Table 1 below.

TABLE 1

|  | Amount of inhibitor Metal in the coal tar pitch [%] | Δ Volume [%] in the range of 1400 to 2400° C. |
|---|---|---|
|  | 0 | 3.0 |
| Ca | 0.6 | 0.9 |
| Mg | 0.6 | 1.4 |
| Ba | 0.6 | 0.8 |

The measured values indicate the good inhibiting effect of the metals of the alkaline earth group for coal tar pitch cokes.

We claim:

1. In a process for the production of graphitized carbon bodies from components consisting essentially of coal tar pitch coke and at least one cokable binder, by mixing to form a green mixture, shaping, coking and graphitization, the improvement which consists essentially of the step of adding at least one compound of metals selected from the group of alkaline earth metals consisting of magnesium, calcium, strontium and barium, said compound being at least partially soluble in the binder to at least one of the components of the green mixture before shaping, said added compound reducing the irreversible thermal expansion of the shaped bodies upon heating to temperatures about 1400° C.

2. Process according to claim 1, which comprises adding auxiliary components to the dry material containing coal tar pitch coke and at least one cokable binder.

3. Process according to claim 1, which comprises adding the compound of metals to the mixture of all of the components.

4. Process according to claim 1, which comprises adding the compound of metals from the group consisting of alkaline earth metal sulphonates.

5. Process according to claim 1, which comprises adding the compound of metals from the group consisting of alkaline earth metal carboxylates.

6. Process according to claim 1, which comprises adding the compound of metals from the group consisting of alkaline earth metal phenolates.

7. Process according to claim 1, which comprises adding at least two compounds of metals from the group consisting of alkaline earth metal sulphonates, alkaline earth metal carboxylates, and alkaline earth metal phenolates, in mixtures.

8. Process according to claim 1, which comprises adding the compound of metals until the content of alkaline earth metals amounts to 0.02 to 0.5% by weight, relative to the coke content.

9. Process according to claim 1, which comprises adding the compound of metals to at least one of the components to be mixed before mixing.

10. Process according to claim 1, which comprises adding the compound of metals to the mixture during mixing.

11. Process according to claim 1, which comprises initially mixing the compound of metals with the binder forming a new mixture, and then adding the new mixture to the particulate components of the mixture.

* * * * *